Figure 1:
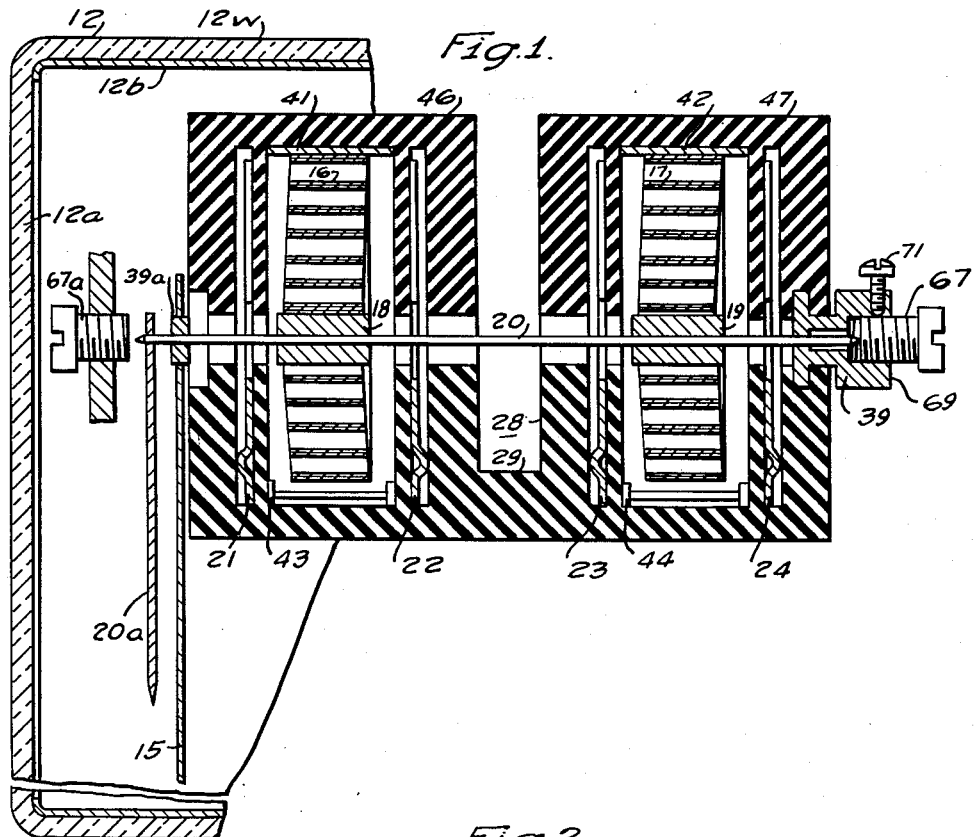

Nov. 20, 1951 A. J. PETZINGER 2,575,728
THERMAL METER, INCLUDING VARIABLE POSITIONING
MEANS FOR ACTIVE ELEMENTS
Filed Feb. 28, 1948

WITNESSES:

INVENTOR
Ambrose J. Petzinger.
BY
ATTORNEY

Patented Nov. 20, 1951

2,575,728

UNITED STATES PATENT OFFICE 2,575,728

THERMAL METER, INCLUDING VARIABLE POSITIONING MEANS FOR ACTIVE ELEMENTS

Ambrose J. Petzinger, Fair Lawn, N. J., assignor to Westinghouse Electric Corporation, East Pittsburgh, Pa., a corporation of Pennsylvania Application February 28, 1948, Serial No. 12,090

16 Claims. (Cl. 171—95)

This invention relates to electro-responsive thermal devices, and it has particular relation to thermal meters utilized for measuring a function of the power of an electrical circuit.

Thermal devices have been employed to a substantial extent in the prior art for various purposes, such as for relays or as meters for measuring various electrical quantities. Such meters have been particularly suitable for measuring the demand for real or reactive power in an electrical circuit. In the form most commonly encountered, the thermal meter may comprise a pair of thermo-responsive elements such as bimetallic spiral springs wound in opposite directions about a common shaft. Each of the bimetallic springs has a separate heater positioned adjacent each radial face of the spring. A meter of this type together with single-phase circuit connections are disclosed in the Smith Patent 2,323,732. The heaters of the thermal meter also may be connected to provide what may be termed a "two-element" meter for measuring a function of the power in a three-wire single-phase circuit or in a polyphase circuit. A thermal meter connected as a two-element meter for measuring the power of a polyphase circuit is illustrated in the Lincoln, et al. Patent 1,300,283.

The accuracy of a thermal meter is dependent to a substantial extent on the maintenance of accurate dimensions during manufacture and on the selection of consistent materials for the meter components. In order to permit reasonable tolerances in manufacture and to permit a reasonable latitude in the selection of materials it is desirable that the accuracy of a thermal meter be adjustable. This is particularly true for thermal meters of the two-element type which are employed for measuring the power of three-wire or polyphase circuits. In the two-element meter the phase balance of the two-elements must be accurately maintained. This means that when either element is energized alone by the same value of power, the reading of the meter should be identical. In order to minimize errors, attempts have been made to shield each of the bimetallic springs. Such shielding is disclosed, for example, in the Downing, Jr. Patent 1,944,656. However, it should be noted that such shielding can not eliminate errors due to certain variations in dimensions or materials such as the dimensions or compositions of the heaters associated with the bimetallic springs.

In accordance with the invention, the accuracy of a thermal device such as a thermal meter is controlled or adjusted by movement of the thermo-responsive element relative to the associated heater or heaters. In a two-element thermal meter, the two bimetallic springs may be moved simultaneously towards the two heaters associated with one element of the meter and away from the two heaters associated with the second element of the meter. Since the adjustment simultaneously modifies the heat received from the four heaters, the resulting cumulative adjustment is extremely effective in controlling the accuracy of the meter. Conveniently, the adjustment may be effected by moving the meter shaft together with the attached parts of the bimetallic springs relative to the associated heaters in a direction parallel to the shaft.

A further control of the meter reading is obtained by properly positioning the bimetallic springs and associated heaters with respect to the casing employed for the meter. In accordance with the common practice, the thermal meter is provided with a casing having a portion which is substantially impervious to radiant energy and a window portion which is relatively pervious to radiant energy. The window portion permits inspection of the heater pointer and scale therethrough. If the bimetallic springs were positioned equidistant from the window portion of the casing and the radiant energy entering the window were uniformly distributed, the accuracy of the meter would be substantially independent of the radiant energy. In a preferred embodiment of the invention, the bimetallic spring which is heated to the higher temperature is located closer than the remaining spring to the window portion.

It is, therefore, an object of the invention to provide an improvement control or adjustment for thermal devices.

It is also an object of the invention to provide a two-element thermal meter with means for adjusting the positions of the thermo-responsive elements of the meter with respect to the heaters associated with each element of the meter.

It is an additional object of the invention to provide mechanism for adjusting the phase balance of a two-element thermal meter.

It is also an object of the invention to provide an improved orientation of a thermal meter with respect to the associated meter casing.

Figure 2:
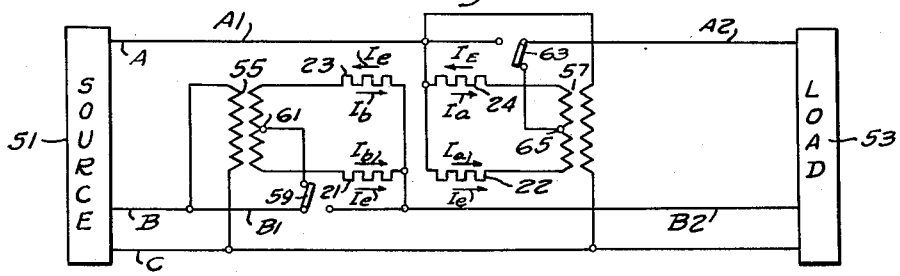

Other objects of the invention will be apparent from the following description taken in conjunction with the accompanying drawing, in which:

Figure 1 is a view in section with parts broken away of a thermal meter embodying the invention; and Fig. 2 is a schematic view showing suitable circuit connections for the meter of Fig. 1.

Referring to the drawing, Fig. 1 shows a thermal meter having two thermo-responsive elements 16 and 17 which conveniently may be in the form of bimetallic spiral springs. These springs have their inner ends secured respectively to hubs 18 and 19 and are wound in opposite directions about a shaft 20. The hubs 18 and 19 are secured to the shaft for rotation therewith. The shaft 20 also carries a pointer 20a which is positioned adjacent a face plate 15. The face plate 15 may carry a suitable scale which cooperates with the pointer 20a to indicate the quantity being measured by the meter. If desired, a maximum demand pointer (not shown) may be associated with the pointer 20a. As well understood in the art, the pointer 20a would act as a pusher arm for pushing the associated maximum demand pointer about the axis of the shaft 20. A maximum demand pointer of this type is clearly shown in the aforesaid Smith and Lincoln patents.

Four heaters 21, 22, 23, and 24 are positioned adjacent the radial faces of the bimetallic springs 16 and 17. When electrical current is passed through the heaters, heat is generated therein and is transferred to the associated bimetallic springs.

A housing 28 constructed of insulating material is provided for the springs and heaters. This housing includes a base portion 29 and caps 46 and 47. The cap 46 together with the base portion defines an enclosure for the bimetallic spring 16 and the associated heaters 21 and 22. Similarly the cap 47 cooperates with the base portion 29 to provide an enclosure for the bimetallic spring 17 and heaters 23 and 24.

Ring bearings 39 and 39a are provided for the shaft 20. These bearings mount the shaft for rotation with respect to the associated housing 28. However, the ring bearings permit axial movement of the shaft 20.

The outer ends of the bimetallic springs 16 and 17 are secured respectively to split rings 41 and 42 which are held in predetermined positions by the housing 28. The housing has ribs 43 and 44 which are located between the split ends of the rings 41 and 42 for positioning purposes.

The bimetallic springs 16 and 17 are so oriented that when they are heated they apply torques in opposite directions to the shaft 20. Consequently, rotation of the shaft 20 is independent of ambient temperatures which effect both of the springs substantially equally.

The meter may be located within a casing which includes a cover 12 ordinarily constructed of glass. The cover includes a generally cylindrical wall portion 12W closed at one end by a window portion 12a. The various parts of the structure shown in Fig. 1 which thus far have been specifically mentioned are similar to corresponding parts illustrated in Figs. 1, 2 and 3 of the aforesaid Smith patent and reference may be made to such patent for a more detailed discussion of the parts.

Suitable circuit connections for the meter of Fig. 1 are illustrated in Fig. 2. A source 51 of electrical energy supplies energy through conductors A, B and C to a load 53. If the system is a three-wire single-phase system, the conductors A and B would be the main conductors and the conductor C would be the common or neutral conductor. If the system is a three-phase three-wire system, the conductors A, B and C represent the three conductors of the polyphase system. For the purpose of discussion, it will be assumed that the system is a three-phase, three-wire system supplying electrical energy at a frequency of 60 cycles per second.

For energizing the various heaters, two voltage transformers 55 and 57 are provided. The voltage transformer 55 has a primary winding connected across conductors B and C. The heaters 21 and 23 are connected in series across the secondary winding of the voltage transformer 55. Consequently, a current component $I_e$ flows in series through the heaters 21 and 23 which is dependent on the voltage between the conductors B and C. The conductor B is divided into two portions B1 and B2. The portion B1 is connected through a single-pole double-throw switch 59 to a center tap 61 located on the secondary winding of the transformer 55. The portion B2 is connected to the common terminal of the heaters 21 and 23. By inspection of Fig. 2, it will be observed that line current flowing through the conductor B divides between the heaters 21 and 23 to provide current components $I_b$. If the line current divides equally, each of the current components $I_b$ is equal to one-half of the line current flowing in the conductor B. The arrows in Fig. 2 represent instantaneous directions of current flow. It is clear then that the heaters 21 and 23 are energized respectively in accordance with the vector sum and the vector difference of the current components $I_e$ and $I_b$. For efficient operation the components $I_e$ and $I_b$ should be approximately equal when the component $I_b$ has its average value.

In a similar manner the heaters 22 and 24 are associated with the conductors A and C. It will be observed that the voltage transformer 57 has its primary winding connected between conductors A and C. Since the heaters 22 and 24 are connected in series across the secondary winding of the transformer 57, they are energized by a current component $I_E$ which is dependent on the voltage between the conductors A and C. In addition, the conductor A is divided into two portions A1 and A2. The portion A1 is connected to the common terminal of the heaters 22 and 24. The portion A2 is connected through a single-pole double-throw switch 63 to a center tap 65 on the secondary winding of the transformer 57. Consequently, line current flowing through the conductor A divides between the heaters 22 and 24 to provide the current components $I_a$. Therefore, the heaters 22 and 24 are energized respectively in accordance with the sum and difference of the current components $I_a$ and $I_E$. It will be understood that the heaters 21 and 23 are associated with one element of the meter; whereas heaters 22 and 24 are associated with a second element of the meter to measure the power of the three-phase circuit in accordance with Blondel's theorem. The heaters 21 and 23 are located adjacent corresponding radial faces of the springs 16 and 17. The heaters 22 and 24 are positioned adjacent the remaining radial faces of the springs 16 and 17.

The accuracy of the meter is dependent to a substantial extent on the phase balance of the two elements. For example, let it be assumed that a source supplies balanced symmetric voltages and that the load 53 is a balanced load. Under these circumstances if the switch 59 is actuated to connect the two portions B1 and B2, a certain reading will be obtained from the meter. Similarly if the switch 59 is left in the position illustrated in Fig. 2 and the switch 53 is actuated to connect the portions A1 and A2 of the conductor A, a second reading may be obtained from the meter. If the two elements are in phase balance, the two readings thus obtained should be identical.

In order to bring the two elements of the meter into phase balance, certain adjustments are provided. These adjustments may be understood by a brief résumé of the effect of movements of the heaters with respect to the associated springs. A portion of the heat generated by the heater 21 is supplied substantially directly to the associated spring 16, a part is supplied indirectly through the housing, and a part is dissipated through various channels. By moving the heater 21 closer to the spring 16, the proportion of heat reaching the spring from the heater may be increased. By moving the heater further away from the spring, the amount of heat may be decreased. Similar comments applied to each of the remaining heaters.

It will be noted further that the heaters 21 and 22 are positioned adjacent radial faces of the spring 16. If the spring 16 is moved in a direction parallel to the shaft 20, it approaches one of the heaters to increase the amount of heat received therefrom; and it departs from the remaining heater to decrease simultaneously the heat received from such remaining heater. Consequently, if the heaters operate at different temperatures, such movement of the bimetallic springs results in a cumulative effect on the total heat supplied to the spring. Similar comments applied to the spring 17 and its associated heaters. For this reason simultaneous movement of both of the springs 16 and 17 may be employed for providing a large range of adjustment for the meter.

Instead of moving the springs bodily, they may be bent into different positions with respect to their heaters by movement of the shaft 20. It will be understood that the bimetallic springs are constructed of laminations of metal and that they are resilient. Let it be assumed that the springs normally are of spiral configuration, but that the inner ends may be deflected against the resilient bias of the springs in an axial direction to give the springs a slightly conical configuration as shown in Fig. 1. In Fig. 1, the shaft has been deflected to the left of its neutral position to urge a substantial portion of the springs 16 and 17 closer to the heaters 21 and 23 and further away from the heaters 22 and 24. Such deflection may be provided by means of a machine screw 67 which is in threaded engagement with a socket 69 secured to the ring bearing 39. A set screw 71 may be provided for retaining the screw 67 in an adjusted position. The adjacent end of the shaft 20 may be made conical in order to decrease the bearing contact between the shaft and screw 67. A similar screw 67a may be associated with the left-hand end of the shaft 20 as viewed in Fig. 1 if deflection of the shaft in the opposite direction is desired.

It will be understood that the clearances between the springs 16 and 17 and adjacent parts of the housing 28 should be sufficient to permit the desired range of deflection of the springs. In a thermal meter of the type shown in the aforesaid Smith patent which is connected as illustrated in Fig. 2, a range of deflection of the shaft 20 of 0.030 inch has been found adequate for adjusting the phase balance of the meter.

To illustrate the method of operation, let it be assumed that for a balanced load the meter has a higher reading when the switch 59 connects the portions B1 and B2 than when the switch 63 connects the portions A1 and A2. To bring the elements into phase balance, the screw 67 then may be actuated to deflect the hubs 18 and 19 together with the associated portions of the springs towards the left as viewed in Fig. 1. This movement of the shaft and associated parts may be proportioned to bring the two elements into phase balance. This may be understood more clearly by considering that the switch 63 is operated to connect the portions A1 and A2 of the conductor A. Under these circumstances the heater 21 is heated to a temperature substantially higher than that of the heater 22. Also the heater 24 is heated to a temperature higher than that of the heater 23. Consequently the movement of the shaft 20 to the left results in an increase in the heat supplied to the spring 16 and a decrease in the heat supplied to the spring 17. The effect of such movement then is to increase the reading of the meter when controlled by the meter element represented by the heaters 21 and 23.

At the same time the movement of the shaft 20 decreases the reading controlled by the meter element comprising the heaters 22 and 24. This may be understood by assuming that the switch 63 occupies the position illustrated in Fig. 2, and that the switch 59 is actuated to connect the portions B1 and B2 of the conductor B. Under these conditions the heater 22 is heated to a temperature higher than that of the heater 21. The heater 24 is heated to a temperature lower than that of the heater 23. Under these circumstances the movement of the shaft 20 towards the left carries portions of the spring 16 into a zone wherein it receives less heat and carries portions of the spring 17 into a zone wherein it receives more heat. Since the resulting difference in the temperatures of the spring 16 and 17 is decreased, the reading of the meter under these conditions is also decreased. For these reasons movement of the shaft 20 in an axial direction is extremely effective in adjusting the phase balance of the meter.

A further control of the meter is obtained by properly locating the meter with respect to the cover 12. In conventional practice the cover for the meter is substantially impervious to radiant energy except for the window portion 12a. If the cover 12 is of glass, a coating impervious to radiant energy, such as heat, may be applied to one of the surfaces of the cover to make desired portions thereof impervious to heat. For example, in Fig. 1 a layer 12b of metal or other material substantially impervious to heat may be applied to the inner surfaces of the cylindrical wall portion 12W of the glass cover.

If the bimetallic spring 17 were located closer than the spring 16 to the window portion 12a, radiant energy entering the window portion would tend to decrease the reading of the meter. If the two bimetallic springs were located equidistant from the window and if radiant energy entering the window were uniformly distributed, the reading of the meter would be substantially unaffected by the incident radiation.

Preferably the spring 16 which is heated in accordance with the sum of the vector components and which, consequently, operates at a temperature higher than that of spring 17, is located closer to the window portion 12a. For this reason radiant energy entering the window portion 12a tends to increase the difference in temperatures between the springs 16 and 17. Since radiant energy entering the window portion 12a increases the meter reading, an incentive is provided for preventing radiant energy from reaching the window portion 12a.

Although the invention has been directed with reference to certain specific embodiments thereof, numerous modifications following within the spirit and scope of the invention are possible.

I claim as my invention:

1. In a thermal device, a shaft, a pair of spaced thermo-responsive elements for controlling rotation of the shaft, means mounting the shaft for rotation, said means permitting axial movement of the shaft, separate heating means positioned adjacent each of the thermo-responsive elements for heating each of the thermo-responsive elements, and positioning means for adjusting the shaft and thermo-responsive elements relative to the heating means in a direction parallel to the shaft.

2. A thermal device as claimed in claim 1 wherein each of the elements has spaced faces radially disposed relative to said shaft, and wherein the heating means comprises a separate electro-responsive heater element positioned adjacent each radial face of each of the thermo-responsive elements.

3. In a thermal device, a shaft, a pair of thermo-responsive resilient spiral springs having inner ends secured to the shaft, supporting means for the outer ends of the springs, bearing means for the shaft permitting axial movement of the shaft, said springs being oriented to rotate the shaft in accordance with the difference in temperatures of the springs, a plurality of electro-responsive heater elements, each of the heater elements being positioned adjacent a separate radial face of the spiral springs, and adjusting means for moving the shaft and attached parts of the springs along the axis of the shaft relative to the heater elements and bearing means.

4. A thermal device as claimed in claim 3 wherein the spiral springs have their inner ends deflected from the planes of the springs to provide springs having a conical configuration.

5. A thermal device as specified in claim 3 in combination with a pair of insulating enclosures, each of said springs and an associated pair of said heater elements being located in a separate one of the enclosures, said adjusting means comprising a screw-actuated member having a portion engaging an end of the shaft.

6. In a thermal electrical power-responsive device, a shaft, first and second thermo-responsive spiral springs wound about the axis of the shaft and having inner ends secured to the shaft, support means for the outer ends of the springs, said springs being designed to actuate the shaft substantially in accordance with the difference in temperatures of the springs, first and second heaters positioned respectively to heat corresponding radial sides of the first and second spiral springs, third and fourth heaters positioned respectively to heat the remaining radial sides of the first and second spiral springs, means connecting the first and second heaters for energization respectively in accordance with the vector sum and difference of an alternating voltage and an alternating current to apply a first torque to the shaft, means connecting the third and fourth heaters for energization respectively in accordance with the vector sum and difference of an alternating voltage and an alternating current to apply a second torque to the shaft, whereby the shaft is actuated in accordance with a function of the power represented by the voltages and currents, and adjusting means for moving the springs substantially parallel to the shaft to adjust the relative values of the two torques, said springs being spaced from adjacent parts of said device to provide a substantial range of adjustment of the adjusting means.

7. A device as claimed in claim 6 wherein the adjusting means comprises means for moving the shaft in an axial direction relative to the heaters.

8. A thermal device as claimed in claim 6 in combination with a casing for the spiral springs, shaft and heaters, said casing having a portion substantially impervious to radiant energy and a window portion substantially pervious to radiant energy, said first spring being at least as close as the second spring to said window portion.

9. A thermal device as claimed in claim 6 wherein the spiral springs are adjusted to conical configurations substantially concentric with the shaft.

10. A thermal unit comprising a shaft, means including a pair of thermo-responsive elements for applying to the shaft a torque proportional to the difference in temperatures of the elements and heating means for heating the elements to the desired temperature difference, in combination with a casing for the thermal unit, said casing having a portion substantially impervious to radiant energy and a window portion substantially pervious to radiant energy, the thermal unit being oriented to position the thermo-responsive unit designed to be heated to the higher temperature at least as close to the window portion as the thermo-responsive element designed to be heated to the lower temperature.

11. The apparatus as defined in claim 10 wherein the last-named thermo-responsive element is positioned further than the other thermo-responsive element from the window.

12. A thermal device as defined in claim 1 wherein when said thermal device is in operative condition said positioning means engages only one end of the shaft.

13. A thermal device as defined in claim 3 wherein when the thermal device is in operative condition the adjusting means engages only one end of the shaft and maintains the inner ends of the spiral springs deflected from the planes of the springs to provide springs having a conical configuration.

14. In a thermal device, a shaft, a supporting structure, a pair of thermo-responsive spiral springs aligned with the shaft to provide a plurality of faces radially disposed relative to the shaft, means mounting the shaft for rotation by the springs relative to the supporting structure in accordance with the difference in temperatures of the springs, a plurality of heater elements, each of the heater elements being positioned adjacent a separate radial face of the spiral springs, said springs having their inner ends deflected from the planes of the springs to provide springs having conical configurations.

15. A device as claimed in claim 6 wherein the support means permits axial movement of the shaft relative thereto, said adjusting means engaging only one end of the shaft when the device is in operative condition.

16. A device as claimed in claim 15 wherein when the device is in operative condition the adjusting means maintains the inner ends of the springs deflected from the planes of the springs to provide springs having conical configurations.

AMBROSE J. PETZINGER.

REFERENCES CITED

The following references are of record in the file of this patent:

UNITED STATES PATENTS

| Number | Name | Date |
|---|---|---|
| 1,300,283 | Lincoln et al. | Apr. 15, 1919 |
| 1,417,695 | Smith | May 30, 1922 |
| 1,811,244 | Paine | June 23, 1931 |
| 1,944,656 | Downing | June 23, 1934 |

FOREIGN PATENTS

| Number | Country | Date |
|---|---|---|
| 249,167 | Italy | Apr. 29, 1926 |